Sept. 10, 1929.     C. W. STUART     1,728,087

CAKE AND PIE TIN

Filed Jan. 18, 1929

INVENTOR
CLYDE WILLIAM STUART
BY
           ATTORNEYS

Patented Sept. 10, 1929.

1,728,087

UNITED STATES PATENT OFFICE.

CLYDE WILLIAM STUART, OF NEW YORK, N. Y.

CAKE AND PIE TIN.

Application filed January 18, 1929. Serial No. 333,484.

This invention relates to cake and pie pans or tins, and has for an object to provide an improved construction wherein a substantially conventional container is provided and a specially constructed cutter or knife associated with the container in such a manner as to separate a pie or cake from the container when the knife or cutter functions.

Another object of the invention is to provide in a cake and pie tin a knife for loosening a cake or pie, the knife being so formed as not to tilt or become wedged while at the same time presenting means which forms a handle.

A further object, more specifically, is to provide in a pie and cake tin a knife formed with converging knife members having at one end a pivotal mounting and at the other end a handle with parts slidably interlocking with the edge of the tin.

In the accompanying drawings,—

Figure 1:
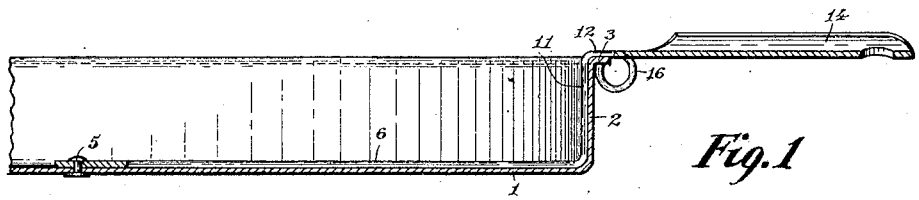
Figure 1 is a sectional view through Figure 2 approximately on the line 1—1.
Figure 2:
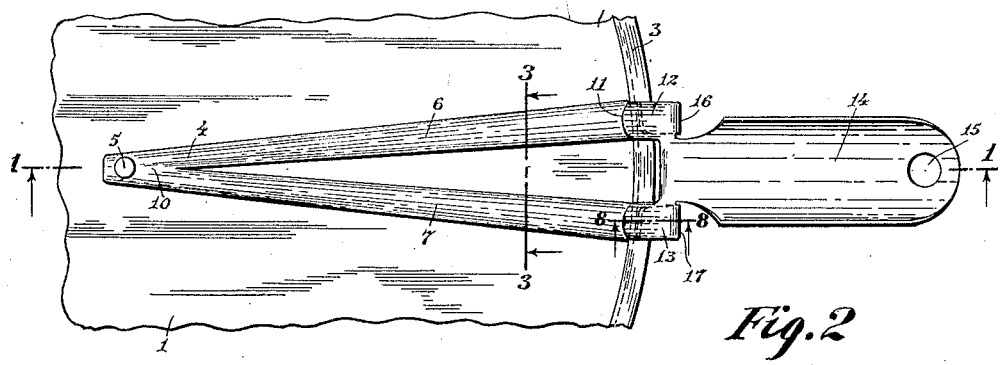
Figure 2 is a top plan view of part of a tin and a knife or cutter embodying the invention.
Figure 3:
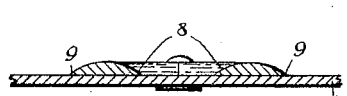
Figure 3 is a sectional view through Figure 2 through the line 3—3.

Referring to the accompanying drawings by numerals, 1 indicates a cake pan having a vertical wall 2 and a radiating flange 3. This flange may be turned over into a bead, if desired. Associated with the pan 1 is a cutter structure 4 pivotally connected with the pan or tin 1 by the rivet 5. The cutter 4 has a pair of knives 6 and 7, each of said knives having inner and outer cutting edges 8 and 9 respectively, as shown in Figure 3. It will be noted from Figure 2 that these knives merge at 10 and from the merging portion 10 they diverge in straight radial lines to wall 2 and then are bent so as to extend upwardly and parallel to wall 2. The upward or vertical portion 11 of each of the knives is sharpened in the same way as illustrated in Figure 3, but the horizontal portions 12 and 13 are not sharpened. The portions 12 and 13 merge into a handle 14 which is preferably rounded somewhat to produce a better grip. An aperture 15 is arranged at the end of the handle 14, so that the entire structure may be supported by a nail or other supporting member. In forming the handle 14 portions 16 and 17 are cut and bent downwardly and into almost a circular form, as shown in Figure 1, so that the end portion 17 of each of the members 16 and 17 loosely fit under the flange 3 so as to hold the knives 6 and 7 against the bottom of the tin, while permitting the cutter to be rotated around the rivet or pivotal member 5. When the device is used the cake dough is placed in the tin 1 and after the dough has been cooked and it is desired to remove the cake, handle 14 is grasped and moved in a circle, whereupon the knives 6 and 7 will function to remove, or rather, loosen the cake from the tin 1. After the cutter has been moved one revolution the tin may be inverted and the cake will fall therefrom under the action of gravity. It will be observed that by reason of the divergence of the knives 6 and 7 and the arrangement of the members 16 and 17 the cutter will not tilt or twist but will freely slide. Also, by forming two knives, namely, knives 6 and 7 with double edges none of the cake will crowd beneath these knives, and consequently, the cutter will not become wedged against movement.

Figure 7:
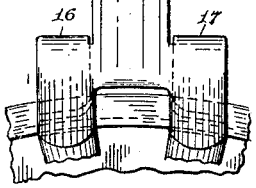
Figure 7 is a view similar to Figure 6 but showing a top plan of the handle and associated parts illustrated in Figure 2.
Figure 8:
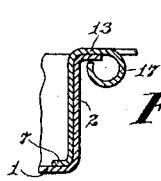
Figure 8 is a fragmentary sectional view through Figure 2 on the line 8—8.

If desired, instead of having the members 16 and 17 turned as shown in Figures 1 and 7, they may be flared laterally as shown by members 16' and 17', whereby the end sections present a wider bracing structure which acts to further prevent any twisting of the cutter.

Figure 5:
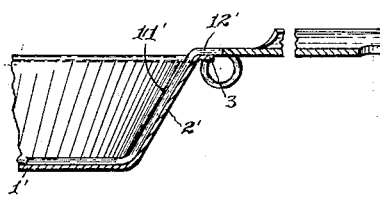
Figure 5 is a view similar to Figure 1 but showing a modified construction wherein the device is applied to a pie tin.
Figure 6:
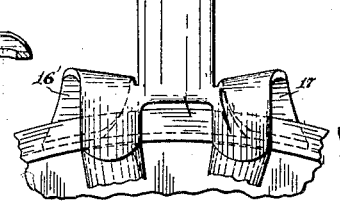
Figure 6 is a plan view on a large scale of the handle and associated parts of a modified form of cutter to that shown in Figure 2.

In Figure 5 a slightly different structure is provided to that shown in Figure 1 in order that the vertical sections 11' of the knives 6 and 7 may fit against the inclined wall 2' of the pan or tin 1'. When baking pies it is customary to permit the covering layer of dough to extend over the flange 3, and in addition, to crimp or press this covering dough to the lower layer of dough for ornamental purposes and also to prevent the juices from emerging during the cooking operation. For this reason the horizontal portions 12' are formed with sharpened edges to cut this edge of the pie crust.

Figure 4:
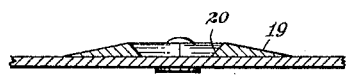
Figure 4 is a view similar to Figure 3 showing a modified form of cutter or knife.

In Figure 4 a modified form of the knives 6 and 7 is shown. In this form of the invention the structure of the knives is identical with that shown in Figure 2, except for their cross-section. In this form of the invention instead of being rounded the surface 19 is straight and also the inner surface 20, but the opposite edges of each knife are sharp. It will also be noted that the knives fit flatwise against the bottom of tin 1.

What I claim is:—

1. A cake and pie tin and cutter therefor, comprising a container having a bottom and a substantially upstanding wall merging into a flange and a cutter formed with a knife fitting flatwise against said bottom, said cutter being formed with upright spaced members having sharp edges fitting against said wall, said edges being chamfered toward the wall so that the cutting part will be next to the wall, means for pivotally connecting said knife to the center of said container, and means integral with the upstanding members presenting a handle and guiding means projecting beneath said flange.

2. A cutter for cake and pie tins, comprising a pair of double-edged knives extending from the side wall of tin converging toward the center, the outer end of the knives being spaced sufficiently to prevent tilting, each of said knives having upstanding double-edged members merging into a pair of horizontal members, each of the horizontal members merging into turned-over extensions positioned so that their ends will slidably fit beneath the flange of said tin and a projection from said horizontal members forming a handle, each of said knives being beveled including said horizontal member with the cutting part next to the tin.

Signed at New York in the county of New York and State of New York this 17th day of January, 1929.

CLYDE WILLIAM STUART.